(No Model.)
R. P. ASHURST.
CULTIVATOR.
No. 475,843. Patented May 31, 1892.
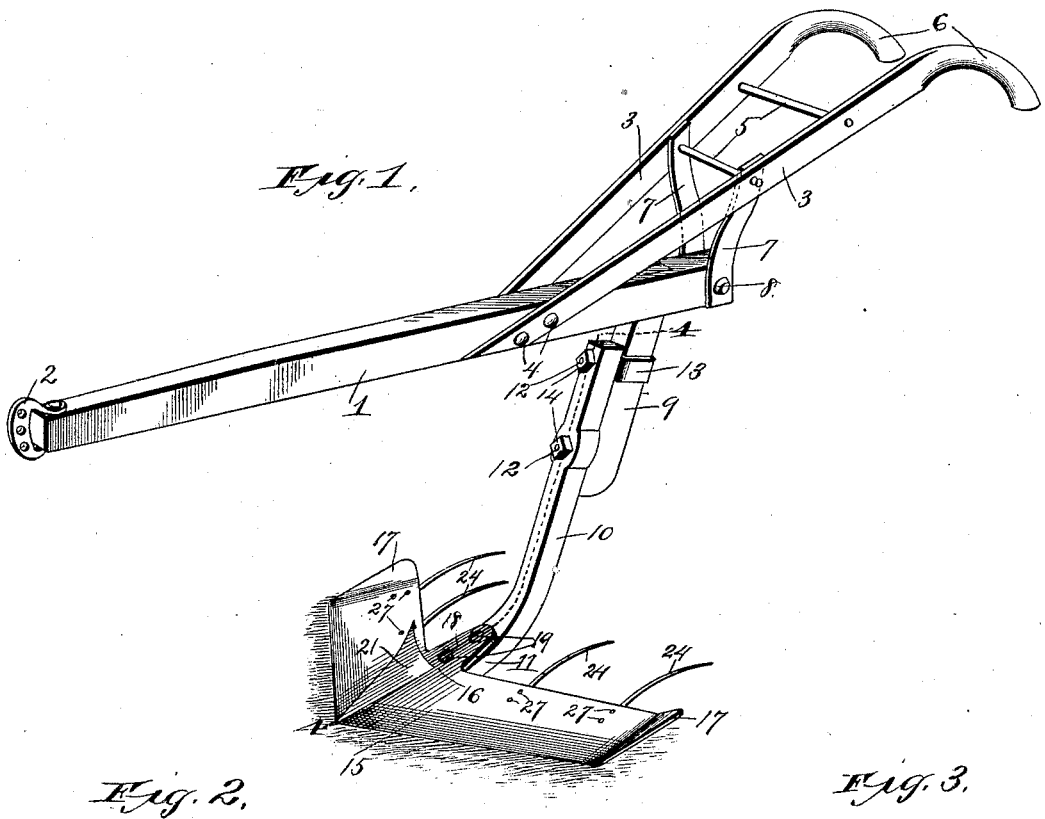
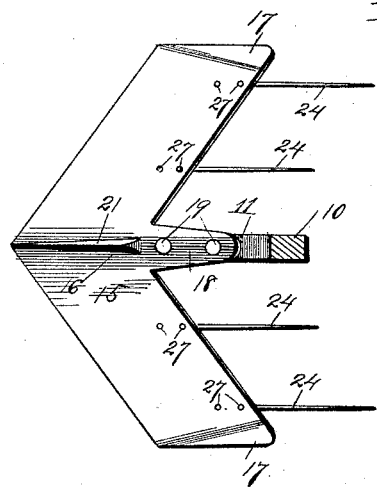
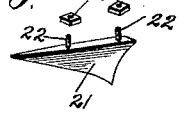
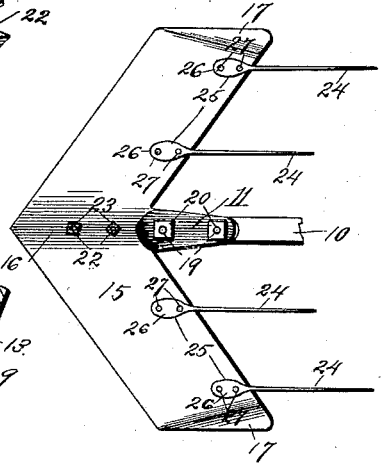
Witnesses:
Inventor:
R. P. Ashurst,
By
Attys.

UNITED STATES PATENT OFFICE.

ROBERT PARKER ASHURST, OF BLACKBURN, MISSOURI.

CULTIVATOR.

SPECIFICATION forming part of Letters Patent No. 475,843, dated May 31, 1892.

Application filed February 19, 1892. Serial No. 422,080. (No model.)

*To all whom it may concern:*

Be it known that I, ROBERT PARKER ASHURST, of Blackburn, Saline county, Missouri, have invented certain new and useful Improvements in Shallow Cultivators for Corn, &c., of which the following is a full, clear, and exact description, reference being had to the accompanying drawings, forming a part hereof.

My invention relates to shallow cultivators or sweeps for corn, cotton, and similar vegetation; and its object is to produce a shallow cultivator or sweep which shall be simple, durable, and inexpensive in construction and capable of attachment to the usual plow or cultivator beams or frames or to riding plows or cultivators.

A further object of my invention is to produce a shallow cultivator or sweep which shall be capable of working effectively at any desired depth and which shall operate equally in dry or wet soil without clogging, and which shall, furthermore, remove all weeds and roots in a rapid and effective manner.

It is my object, finally, to produce a shallow cultivator which shall be of light draft, so that it can be drawn along without excessive labor on the part of the draft-animals.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a perspective view of my improved shallow cultivator or sweep in operative connection with a cultivator or plow beam. Fig. 2 is a horizontal section of the same on the line 2 2 of Fig. 4. Fig. 3 is a detached inverted plan view of the cultivator or sweep. Fig. 4 is a vertical longitudinal section of the cultivator on the line 4 4 of Fig. 1. Fig. 5 comprises an inverted perspective view of the upwardly-extending root-cutting and earth-dividing cutter of the cultivator or sweep and also a perspective view of its attaching-nuts.

In the said drawings, 1 designates the beam of a plow or cultivator, the said beam being either of the usual or any suitable or preferred form and material. At its front end this beam is shown as provided with a clevis 2, which may also be either of the precise form shown or of any other suitable or preferred form.

3 designates the stilts of the frame, the lower ends of said stilts being shown as secured to opposite sides of the rear portion of the beam 1 by suitable through-bolts 4 and the upper portions of said stilts being shown as connected by suitable cross-bars 5, while the upper extremities of the stilts terminate in suitable handles 6. About midway of its length each of the stilts 3 is connected to the rear end of the beam 1 by a vertical upwardly and outwardly curved brace 7, the upper ends of said braces being connected to the inner sides of the stilts 3 by the lower cross-bar 5 and the lower ends of said braces being connected to opposite sides of the rear end of the beam 1 by a through-bolt 8.

9 designates the post or standard of the beam, said post or standard being mortised or otherwise suitably secured in the rear end of the beam 1 and depending obliquely downward and forward therefrom.

It is to be understood that while I have shown my improved shallow cultivator or sweep as connected to this precise form of plow-beam and its attachments, said parts may be modified in any manner desired, and that the cultivator or sweep may be attached to a riding or wheeled frame, if preferred, without departing from the essential spirit of my invention.

10 designates the upright or standard of my improved cultivator or sweep, the said upright being either of wood or metal, as preferred, and its lower portion 11 being curved obliquely downward and forward, as shown. The upper portion of this upright or standard 10 extends obliquely upward and rearward, and its upper end is shown as resting against and overlapping the lower end portion of the post or standard 9. A pair of vertically-disposed through-bolts 12 are shown as passing transversely through the upper portion of the standard 10, the lower bolt passing, also, similarly through the lower portion of the standard or post 9. The upper bolt 12 is formed integrally with the front of a metal guide or strap 13, which surrounds the standard or post 9. Nuts 14 are shown as screwed upon the front ends of the bolts 12 and as serving to retain the bolts and the post and standard in position.

15 designates the body portion or shoe of the cultivator or sweep, the said body portion or shoe being of suitable metal—such as cast or wrought iron or steel—and being, also, of approximately V form in cross-section. The body portion or shoe is composed of two integral portions, each of which is of approximately rectangular form and each of which diverges obliquely outward and rearward from the other. The upper side of the body portion or shoe 15 is thus approximately convex, while its under side is approximately concave, and a central longitudinal ridge 16 is thus formed for the said body portion or shoe. Each outer extremity of each of the rectangular portions of the shoe is turned upwardly and outwardly at 17, so that as the implement is drawn along the outer ends of the furrow-slice shall be readily severed from the adjacent portions of the ground. From the middle of the rear margin of the body portion or shoe 15 projects upwardly and rearwardly an integral extension 18 of the shoe, the lower forwardly-curved end of the standard projecting beneath said extension and being secured thereto by bolts 19 and nuts 20, said bolts extending approximately vertically through the extension 18 and curved portion 11 and being retained in position by the nuts 20. From the mid rib or ridge 16 of the shoe 15 extends upwardly a triangular spur or cutter 21, the apex of said spur or cutter being uppermost and the base of said cutter being formed with two integral bolts 22, which pass downwardly through the ridge of the shoe. These bolts are retained in position by nuts 23, which are screwed upon the lower ends of the bolts, as shown. From the rear margin of the shoe 15 extend a number of fingers 24, the inner or front ends 25 of which are flattened, as shown at 26. The body portions of these fingers are rounded and their outer ends are sharply pointed, and said fingers extend obliquely upward and rearward and are secured to the shoe by rivets 27, as shown.

From the above description it will be seen that as the shoe 15 is drawn forward beneath the ground it cuts and lifts the upper layer of the soil, and that such layer is carried backward upon the fingers 24, by which the layer of soil is completely pulverized, the weeds being separated from the soil and left upon the top of the same. Owing to the form and position of the fingers 24, the shoe can never become clogged, and the implement is enabled to work effectively in both dry and wet soils.

The draft of the implement is very light, so that the draft-animals are not subjected to excessive labor, and the ground is left perfectly level after the implement has passed through it. It is to be further observed that as the implement is drawn along the spur or cutter 21 severs any cross-roots which may lie in the path of the shoe and which would otherwise interfere with the pulverizing action of the fingers 24, and that said spur also divides the furrow-slice so that its two portions may readily pass upon the fingers 24 and be pulverized by the latter.

Having thus described my invention, what I claim as new therein, and desire to secure by Letters Patent, is—

A shallow cultivator or sweep comprising a body portion or shoe composed of two integral portions, each of concavo-convex form in cross-section and each extending obliquely outward and rearward from each other, and each, furthermore, turned obliquely upward and outward at its outer end, a longitudinal rib or ridge located midway of the length of the shoe, and an integral extension projecting rearwardly from the rear margin of the shoe midway of the length thereof, a number of teeth or prongs secured to the rear margin of the shoe and rounded and pointed and also curved, so as to extend obliquely rearward and upward, a standard curved downward and forward at its lower end and extending beneath the rearward projection and bolted thereto, and a spur of approximately triangular form having a rearwardly and upwardly extending upper edge, a number of bolt-like projections formed upon the under side of the tooth or spur and extending downwardly through the rib or ridge of the shoe, and retaining-nuts screwed upon the lower ends of said projections, substantially as set forth.

In testimony whereof I affix my signature in presence of two witnesses.

ROBERT PARKER ASHURST.

Witnesses:
D. M. PINKERTON,
THOS. W. DAVIS.